(12) United States Patent
Kim et al.

(10) Patent No.: US 10,558,072 B2
(45) Date of Patent: Feb. 11, 2020

(54) LIGHT GENERATING MEMBER AND DISPLAY APPARATUS HAVING THE SAME

(71) Applicant: Samsung Display Co., Ltd., Yongin-Si, Gyeonggi-do (KR)

(72) Inventors: Youra Kim, Seoul (KR); Donghoon Kim, Suwon-si (KR); Young-min Park, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 15/365,013

(22) Filed: Nov. 30, 2016

(65) Prior Publication Data

US 2017/0192295 A1 Jul. 6, 2017

(30) Foreign Application Priority Data

Jan. 6, 2016 (KR) .................. 10-2016-0001654

(51) Int. Cl.
*G02F 1/1335* (2006.01)
*G02F 1/13357* (2006.01)

(52) U.S. Cl.
CPC ...... *G02F 1/133504* (2013.01); *G02F 1/1336* (2013.01); *G02F 1/133512* (2013.01); *G02F 2001/133614* (2013.01); *G02F 2202/36* (2013.01)

(58) Field of Classification Search
CPC ...... G02F 1/133602–133614; G02F 1/133512; G02F 1/133504; G02F 2001/01791; G02B 6/005; G02B 6/0033–0063; H01L 31/035218
See application file for complete search history.

(56) References Cited

U.S. PATENT DOCUMENTS

| | | | |
|---|---|---|---|
| 2002/0060901 A1 | 5/2002 | Saccomanno | |
| 2008/0079866 A1* | 4/2008 | Mimura | G02F 1/133524 349/61 |
| 2008/0137012 A1* | 6/2008 | Louwsma | G02F 1/133512 349/106 |
| 2009/0115943 A1* | 5/2009 | Gaides | B29D 11/0073 349/96 |
| 2010/0214506 A1* | 8/2010 | Gaides | G02B 5/0263 349/61 |
| 2012/0013830 A1* | 1/2012 | Asada | G02F 1/133512 349/106 |
| 2013/0313595 A1 | 11/2013 | Naasani et al. | |
| 2014/0160408 A1 | 6/2014 | Cho et al. | |
| 2014/0367873 A1 | 12/2014 | Yang et al. | |

(Continued)

FOREIGN PATENT DOCUMENTS

| KR | 100426963 B1 | 3/2004 |
|---|---|---|
| KR | 1020050010726 A | 1/2005 |

(Continued)

*Primary Examiner* — Paisley L Wilson
*Assistant Examiner* — Mariam Qureshi
(74) *Attorney, Agent, or Firm* — Cantor Colburn LLP

(57) ABSTRACT

A display apparatus includes a display panel, a backlight unit which provides a light to the display panel, and a light control member disposed between the display panel and the backlight unit. The light control member includes a plurality of first barrier wall members extending in a first direction and arranged in a second direction crossing the first direction.

32 Claims, 7 Drawing Sheets

(56) References Cited

U.S. PATENT DOCUMENTS

2015/0301408 A1* 10/2015 Li .................... G02F 1/133621
  362/84
2016/0223870 A1* 8/2016 Miki ................. G02F 1/133617
2016/0291218 A1* 10/2016 Asaoka ............... G02B 5/0236

FOREIGN PATENT DOCUMENTS

| KR | 1020070001465 A | 1/2007 |
| KR | 100790698 B1 | 12/2007 |
| KR | 1020070122418 A | 12/2007 |
| KR | 101350590 B1 | 1/2014 |
| KR | 101351886 B1 | 1/2014 |
| KR | 1020140021258 A | 2/2014 |
| KR | 101556610 B1 | 9/2015 |

* cited by examiner

LIGHT GENERATING MEMBER AND DISPLAY APPARATUS HAVING THE SAME

This application claims priority to Korean Patent Application No. 10-2016-0001654, filed on Jan. 6, 2016, and all the benefits accruing therefrom under 35 U.S.C. § 119, the content of which in its entirety is herein incorporated by reference.

BACKGROUND

1. Field

The disclosure relates to a light generating member and a display apparatus having the light generating member. More particularly, the disclosure relates to a light generating member that effectively prevents a color mixture, and a display apparatus including the light generating member.

2. Description of the Related Art

A display apparatus typically includes a display panel that displays an image using a light and a backlight unit that generates the light. The backlight unit may be disposed under the display panel to provide the light to the display panel.

The display panel may include a plurality of pixels for displaying the image using the light and color filters for allowing the light passing through the pixels to have colors. The color filters may be disposed to correspond to the pixels in a one-to-one correspondence, and the color filters may include red, green, and blue color filters. However, an amount of the light in the display panel including the color filters is reduced to one-third the original amount.

In recent years, color conversion layers including quantum dots having high light efficiency is used instead of the color filters. The color conversion layers allow the light generated by the backlight unit to have a predetermined color.

SUMMARY

The disclosure provides a light generating member capable of preventing a color mixture.

The disclosure provides a display apparatus including the light generating member.

According to an embodiment of the inventive concept, a display apparatus includes a display panel, a backlight unit which provides a light to the display panel, and a light control member disposed between the display panel and the backlight unit. The light control member includes a first substrate member, a second substrate member facing the first substrate member, and a plurality of first barrier wall members disposed between the first and second substrate members, extending in a first direction, and arranged in a second direction crossing the first direction.

In an embodiment, the first barrier wall members may restrict an exit angle of the light from the backlight unit to a predetermined angle.

In an embodiment, the first barrier wall members may be arranged in the second direction at regular intervals.

In an embodiment, the first barrier wall members may include a carbon black which absorbs the light.

In an embodiment, the display panel may further include a first substrate including a plurality of pixels, a second substrate including a plurality of light conversion layers having different thicknesses from each other and a black matrix disposed between the light conversion layers, and a liquid crystal layer disposed between the first substrate and the second substrate.

In an embodiment, the light conversion layers may include a plurality of first light conversion layers which converts the light to a light having a first color, a plurality of second light conversion layers which converts the light to a light having a second color, and a plurality of light transmission layers which transmits the light, and the light has a third color.

In an embodiment, each of the first light conversion layers may include a plurality of first quantum dots which converts the light to the light having the first color and a first resin which accommodates the first quantum dots.

In an embodiment, each of the second light conversion layers may include a plurality of second quantum dots which converts the light to the light having the second color and a first resin which accommodates the second quantum dots.

In an embodiment, the first color may be a red color, the second color may be a green color, and the third color may be a blue color.

In an embodiment, the light transmission layers may have a thickness greater than a thickness of the second light conversion layers, the thickness of the second light conversion layers may be greater than a thickness of the first light conversion layers, and the black matrix may have a thickness equal to or smaller than the thickness of the first light conversion layers.

In an embodiment, the display panel may include a plurality of pixel areas corresponding to the pixels and a non-pixel area disposed between the pixel areas, the light conversion layers may be disposed in the pixel areas, and the black matrix may be disposed in the non-pixel area.

In an embodiment, the first barrier wall members may restrict the exit angle of the light to an angle smaller than a first angle between a reference line and a first boundary line, where the reference line is defined by a line extending in a third direction crossing the first and second directions at a boundary between each light conversion layer and the black matrix, and the first boundary line is defined by a line connecting a lower end of a side surface of the black matrix, which is opposite to another surface of the black matrix overlapping the reference line, to a contact point at which the reference line makes contact with a lower surface of the second substrate.

In an embodiment, a second angle between a horizontal surface and a second boundary line may be greater than an angle obtained by subtracting the first angle from about 90 degrees, where the second boundary line is defined by a line connecting a lower end of a first side surface of a first barrier wall member to an upper end of a second side surface of an adjacent first barrier wall member, which faces the first side surface of the first barrier wall.

In an embodiment, the second angle may be in a range from about 60 degrees to about 80 degrees.

In an embodiment, The first barrier wall members may have a thickness in a range from about 20 micrometers to about 150 micrometers, a width of an upper surface of the first barrier wall members may be equal to or greater than about 3 micrometers, and a distance between lower surfaces of the first barrier wall members adjacent to each other may be in a range from about 20 micrometers to about 100 micrometers.

In an embodiment, a width of a portion of a lower surface of the first barrier wall members, which does not overlap an upper surface of the first barrier wall members, may be obtained by the following equation: $W = T1 \times \tan(\theta 3)$, where W denotes the width of the portion of the lower surface of the first barrier wall members, T1 denotes the thickness of the first barrier wall members, θ3 denotes a third angle between a third direction crossing the first and second directions and a side surface of the first barrier wall members, and the third angle is in a range from about 1 degree to about 3 degrees.

In an embodiment, the light control member may further include a second resin disposed between the first barrier wall members.

In an embodiment, the first and second substrate members may include polyethylene terephthalate, and the second resin may include an acrylic resin.

In an embodiment, the light control member may further include a plurality of second barrier wall members extending in the second direction and arranged in the first direction at regular intervals.

According to another embodiment of the inventive concept, a light generating member includes a backlight unit which generates a light and a light control member disposed on the backlight unit. The light control member includes a first substrate member, a second substrate member facing the first substrate member, and a plurality of first barrier wall members disposed between the first and second substrate members, extending in a first direction, and arranged in a second direction crossing the first direction. The first barrier wall members restrict an exit angle of the light exiting from the backlight unit to a predetermined angle.

According to another embodiment of the inventive concept, a display apparatus includes a display panel, a backlight unit which provides a light to the display panel, and a light control member disposed between the display panel and the backlight unit. The light control member includes a first substrate member, a second substrate member facing the first substrate member, and a plurality of first barrier wall members disposed between the first and second substrate members, extending in a first direction, and arranged in a second direction crossing the first direction at regular intervals. The first barrier wall members restrict an exit angle of the light exiting from the backlight unit to a predetermined angle.

According to embodiments described above, the display apparatus restricts the exit angle of the light from the backlight unit to the predetermined angle by using the light control member disposed between the display panel and the backlight unit.

BRIEF DESCRIPTION OF THE DRAWINGS

The above and other features of the disclosure will become readily apparent by reference to the following detailed description when considered in conjunction with the accompanying drawings, in which.

DETAILED DESCRIPTION

Figure 1:
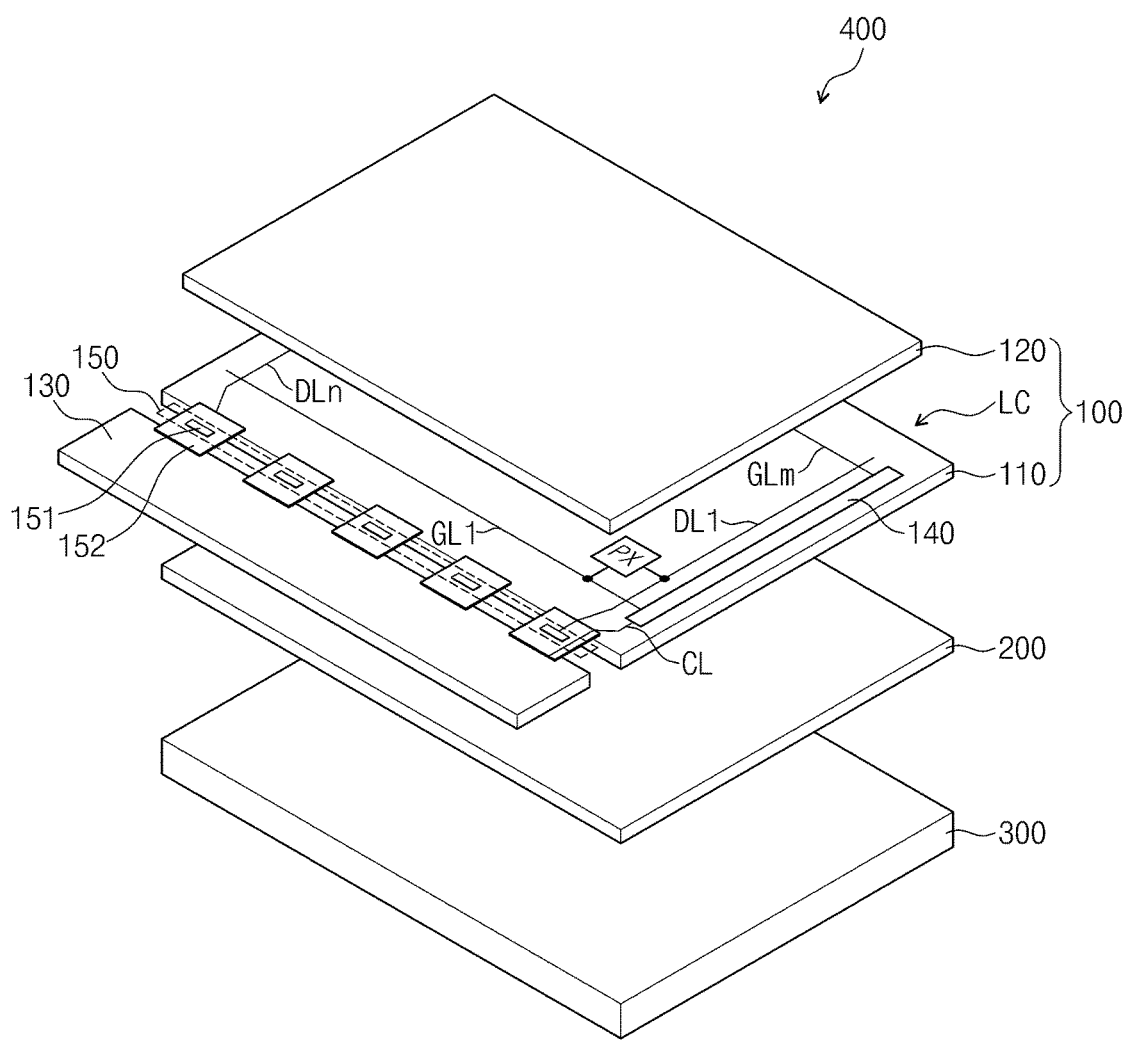
FIG. 1 is an exploded perspective view showing a display apparatus according to an exemplary embodiment of the disclosure.

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms, "a", "an" and "the" are intended to include the plural forms as well, unless the context clearly indicates otherwise. It will be further understood that the terms "comprises" and/or "comprising," or "includes" and/or "including", when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

Hereinafter, exemplary embodiments of the invention will be described in detail with reference to the accompanying drawings.

FIG. 1 is an exploded perspective view showing a display apparatus according to an exemplary embodiment of the disclosure.

Referring to FIG. 1, an exemplary embodiment of the display apparatus 400 includes a display panel 100, light generating members 200 and 300, a driving circuit board 130, a gate driver 140, and a data driver 150. The display panel 100 and the light generating members 200 and 300 may have short sides in a first direction DR1 and long sides in a second direction DR2 crossing, e.g., perpendicular to, the first direction DR1.

The light generating members 200 and 300 generate a light and provide the light to the display panel 100. An emission angle of the light generated by the light generating members 200 and 300 is restricted to a predetermined angle while the light is provided to the display panel 100. The display panel 100 displays an image using the light provided from the light generating members 200 and 300.

The display panel 100 includes a first substrate 110, a second substrate 120 opposite to, e.g., facing, the first substrate 110, and a liquid crystal layer LC disposed between the first and second substrates 110 and 120. The first substrate 110 includes a plurality of pixels PX, a plurality of gate lines GL1 to GLm, and a plurality of data lines DL1 to DLn. Each of "m" and "n" is an integer number greater than zero (0). For the convenience of illustration, FIG. 1 shows only one pixel PX, but the pixels PX are arranged on the first substrate 110.

The gate lines GL1 to GLm are disposed to be insulated from the data lines DL1 to DLn while crossing the data lines DL1 to DLn. The gate lines GL1 to GLm extend in the second direction DR2 and are connected to the gate driver 140. The data lines DL1 to DLn extend in the first direction DR1 and are connected to the data driver 150.

The pixels PX are disposed in areas defined by the gate lines GL1 to GLm and the data lines DL1 to DLn crossing the gate lines GL1 to GLm as a matrix form. The pixels PX are connected to the gate lines GL1 to GLm and the data lines DL1 to DLn.

The gate driver 140 is disposed at a predetermined area of the first substrate 110, which is adjacent to an end of the first substrate 110 in the second direction DR2. In an exemplary embodiment, the gate driver 140 may be substantially simultaneously formed with transistors of the pixels PX, and then mounted on the first substrate 110 in an amorphous silicon TFT gate driver circuit ("ASG") method or in an oxide silicon TFT gate driver circuit ("OSG") method.

In an alternative exemplary embodiment, the gate driver 140 may be formed in plural driving chips, mounted on a flexible printed circuit board, and connected to the first substrate 110 in a tape carrier package method. In another alternative exemplary embodiment, the gate driver 140 may be formed in plural driving chips and mounted on the first substrate 110 in a chip-on-glass ("COG") method.

A timing controller (not shown) is disposed on the driving circuit board 130. The timing controller is disposed on the driving circuit board 130 in the form of an integrated circuit chip and connected to the gate driver 140 and the data driver 150. The timing controller outputs a gate control signal, a data control signal, and image data.

The gate driver 140 receives the gate control signal from the timing controller through a control line CL. The gate driver 140 generates a plurality of gate signals in response to the gate control signal and sequentially outputs the gate signals to the gate lines GL1 to GLm. The gate signals are applied to the pixels PX through the gate lines GL1 to GLm in the unit of row, such that the pixels PX are driven in the unit of row.

The data driver 150 includes a plurality of source driving chips 151. The source driving chips 151 are mounted on flexible printed circuit boards 152, respectively, and connected between the driving circuit board 130 and a predetermined area near an end of the first substrate 110 in the first direction DR1. Such a connection manner is called a tape carrier package ("TCP") manner, but in an alternative exemplary embodiment, the data driver 150 may be mounted on the first substrate 110 in a chip on glass ("COG") manner after being formed in a plurality of driving chips.

The data driver 150 receives the image data and the data control signal. The data driver 150 generates data voltages corresponding to the image data in an analog form in response to the data control signal. The data voltages are applied to the pixels PX through the data lines DL1 to DLn.

The pixels PX receive the data voltages through the data lines DL1 to DLn in response to the gate signals provided through the gate lines GL1 to GLm. The pixels PX display grayscales corresponding to the data voltages, and thus the image is displayed.

The light generating members 200 and 300 include a light control member 200 that restricts the light emission angle to the predetermined angle and a backlight unit 300 that emits the light. The light control member 200 will be described in greater detail later.

The light generated by the backlight unit 300 may be, but not limited to, a blue light. The backlight unit 300 includes a plurality of light source units that emit the blue light. The second substrate 120 of the display panel 100 includes a plurality of light conversion layers that converts the blue light to a red or green light, or transmits the blue light. This will be described in greater detail later.

Figure 2:
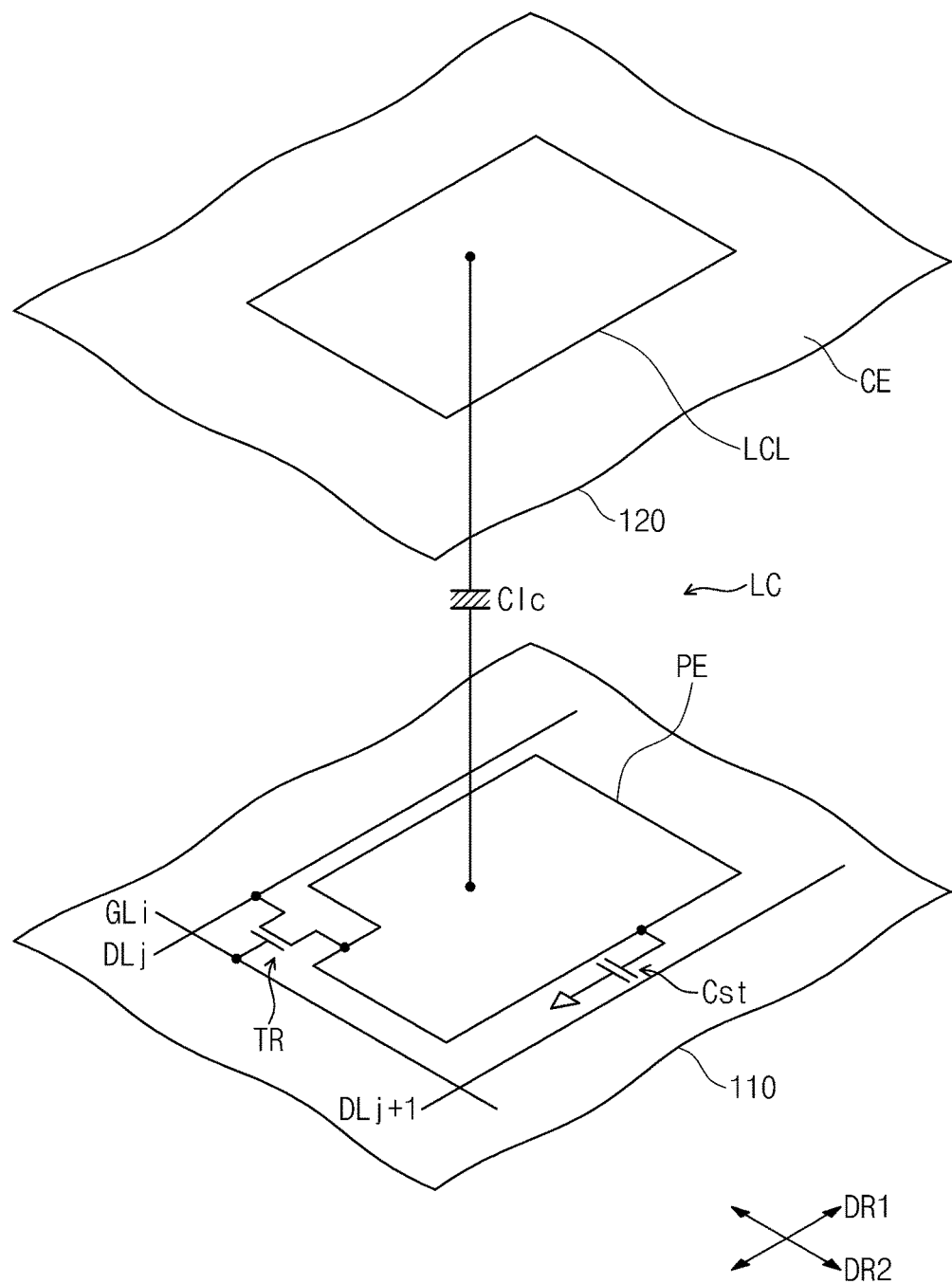
FIG. 2 is a view showing a circuit configuration of a pixel shown in FIG. 1.

FIG. 2 is a view showing a circuit configuration of a pixel shown in FIG. 1.

For the convenience of illustration, FIG. 2 shows a pixel PX connected to a gate line GLi and data line DLj. Although not shown in figures, the other pixels PX of the display panel 110 have the same structure and function as those of the pixel PX shown in FIG. 2.

Referring to FIG. 2, in an exemplary embodiment, the pixel PX includes a transistor TR connected to the gate line GLi and the data line DLj, a liquid crystal capacitor Clc connected to the transistor TR, and a storage capacitor Cst connected to the liquid crystal capacitor CLc in parallel. In an alternative exemplary embodiment, the storage capacitor Cst may be omitted. Herein, each of "i" and "j" is a natural number.

The transistor TR is disposed on the first substrate 110. The transistor TR includes a gate electrode connected to the gate line GLi, a source electrode connected to the data line DLj, and a drain electrode connected to the liquid crystal capacitor Clc and the storage capacitor Cst.

The liquid crystal capacitor Clc includes a pixel electrode PE disposed on the first substrate 110, a common electrode CE disposed on the second substrate 120, and the liquid crystal layer LC disposed between the pixel electrode PE and the common electrode. The liquid crystal layer LC serves as a dielectric substance of the liquid crystal capacitor Clc. The pixel electrode PE is connected to the drain electrode of the transistor TR.

In an exemplary embodiment, as shown in FIG. 2, the pixel electrode PE may have a non-slit structure, but it should not be limited thereto or thereby. In such an embodiment, the pixel electrode PE may have a slit structure including a trunk portion having a cross shape and a plurality of branch portions extending from the trunk portion in radial form.

In an exemplary embodiment, the common electrode CE is disposed on an entire surface of the second substrate 120, but it should not be limited thereto or thereby. In such an embodiment, the common electrode CE may be disposed on the first substrate 110. In an exemplary embodiment, at least one of the pixel electrode PE and the common electrode CE may include a slit.

The storage capacitor Cst includes the pixel electrode PE, a storage electrode (not shown) branched from a storage line (not shown), and an insulating layer disposed between the pixel electrode PE and the storage electrode. In an exemplary embodiment, the storage line is disposed on the first substrate 110 and substantially simultaneously formed with the gate lines GL1 to GLm in or on a same layer as the gate lines GL1 to GLm. The storage electrode partially overlaps the pixel electrode PE.

The pixel PX further includes a light conversion layer LCL disposed on the second substrate 120. The light conversion layer LCL converts a color of the light provided from the backlight unit 300 or transmits the light without converting the color of the light. In one exemplary embodiment, for example, the light generated by the backlight unit 300 is the blue light, and the light conversion layer LCL converts the blue light provided from the backlight unit 300 to the red or green light or transmits the blue light without converting the color of the light.

The transistor TR is turned on in response to the gate signal provided through the gate line GLi. The data voltage provided through the data line DLj is provided to the pixel electrode PE of the liquid crystal capacitor Clc through the turned-on transistor TR. The common electrode CE is applied with the common voltage.

An electric field is generated between the pixel electrode PE and the common electrode CE due to a difference in voltage level between the data voltage and the common voltage. Liquid crystal molecules of the liquid crystal layer LCL are operated by the electric field generated between the pixel electrode PE and the common electrode CE. A light transmittance of the liquid crystal layer LCL is controlled by the liquid crystal molecules operated by the electric field, and thus the image is displayed.

The storage line receives a storage voltage having a constant voltage level, but it should not be limited thereto or thereby. Alternatively, the storage line may receive the common voltage. The storage capacitor Cst compensates the voltage charged in the liquid crystal capacitor Clc.

Figure 3:
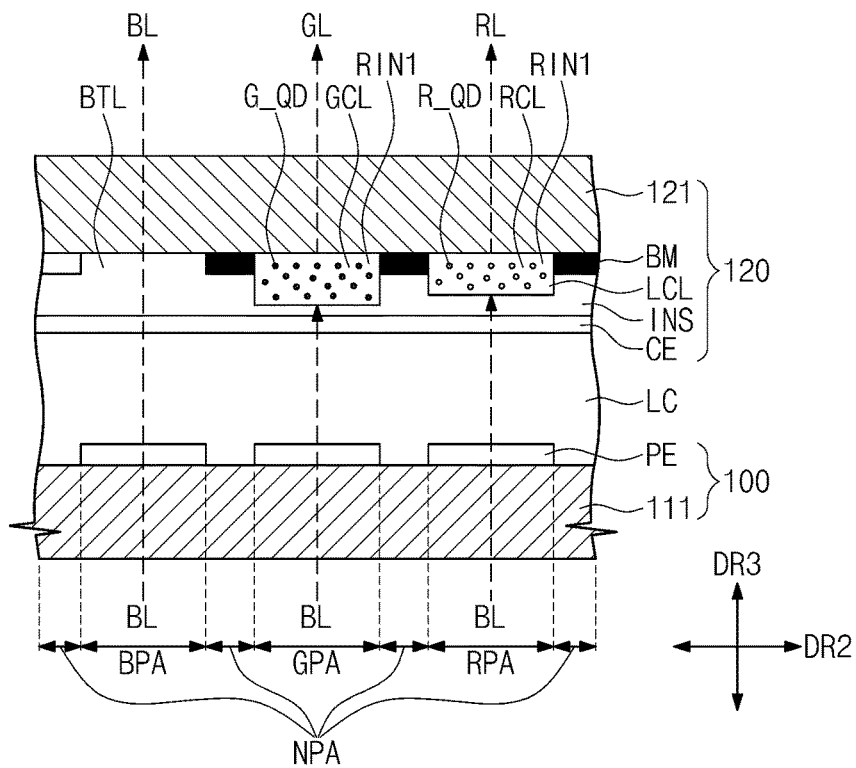
FIG. 3 is a cross-sectional view showing a predetermined area of a display panel shown in FIG. 1.

FIG. 3 is a cross-sectional view showing a predetermined area of the display panel shown in FIG. 1.

FIG. 3 shows the cross-section of a unit pixel of the display panel including three pixels PX that display different colors from each other, and the pixel electrode PE of the three pixels.

Referring to FIG. 3, a plurality of pixel areas BPA, GPA, and RPA corresponding to the pixels PX and a non-pixel area NPA between the pixels areas BPA, GPA, and RPA are defined on a flat area of the first substrate 110 of the display panel 100 and a flat area of the second substrate 120 of the display panel 100. The pixel areas BPA, GPA, and RPA include a red pixel area RPA for displaying a red color, a green pixel area GPA for displaying a green color, and a blue pixel area BPA for displaying a blue color.

For the convenience of illustration, FIG. 3 shows three pixel areas BPA, GPA, and RPA, but the pixel areas BPA, GPA, and RPA include a plurality of red pixel areas RPA, a plurality of green pixel areas GPA, and a plurality of blue pixel areas BPA.

The first substrate 110 includes a first base substrate 111 and a plurality of pixel electrodes PE disposed on the first base substrate 111. The first base substrate 111 may be, but not limited to, a glass or plastic substrate having a light transmittance. The pixel electrodes PE are disposed in a pixel area of the pixel areas BPA, GPA, and RPA.

The second substrate 120 includes a second base substrate 121, a plurality of light conversion layers LCL disposed under the second base substrate 121, a black matrix BM, an insulating layer INS, and a common electrode CE. The second base substrate 121 may be, but not limited to, a glass or plastic substrate having a light transmittance. In an exemplary embodiment, where each of the first and second substrates 111 and 121 is the plastic substrate having flexibility, the display panel 100 may be a flexible display panel.

The light conversion layers LCL are disposed in the pixel areas PA under, e.g., on an inner surface of, the second base substrate 121. The black matrix BM is disposed in the non-pixel area NPA under, e.g., on an inner surface of, the second base substrate 121.

The insulating layer INS is disposed under the light conversion layers LCL and the black matrix BM. The insulating layer INS covers the light conversion layers LCL and the black matrix BM, and thereby planarizes lower portions of the light conversion layers LCL and the black matrix BM. The insulating layer INS may be referred to as a planarization layer.

The common electrode CE is disposed under the insulating layer INS. The common electrode CE is disposed to face the pixel electrodes PE. As described above, the liquid crystal molecules are operated by the electric field formed between the pixel electrodes PE and the common electrode CE. The light BL generated by the backlight unit 300 is provided to the light conversion layers LCL after passing through the liquid crystal layer LC.

In an exemplary embodiment, the light conversion layers LCL include a first light conversion layer RCL, a second light conversion layer GCL, and a light transmission layer BTL, which are sequentially arranged in the second direction DR2. In such an embodiment, the arrangement order of the first light conversion layer RCL, the second light conversion layer GCL and the light transmission layer BTL should not be limited thereto or thereby.

For the convenience of illustration, FIG. 3 shows three light conversion layers LCL, but the light conversion layers LCL include a plurality of first light conversion layers RCL, a plurality of second light conversion layers GCL, and a plurality of light transmission layers BTL.

The first light conversion layer RCL is disposed in the red pixel area RPA, and the second light conversion layer GCL is disposed in the green pixel area GPA. The light transmission layer BTL is disposed or defined in the blue pixel area BPA.

A thickness of the second light conversion layers GCL in a third direction DR3 crossing the first and second directions DR1 and DR2 is greater than a thickness of the first light conversion layer RCL in the third direction DR3. The black matrix BM has a thickness smaller than that of the second light conversion layer GCL. The thickness of the black matrix BM is equal to or smaller than the thickness of the first light conversion layer RCL. In one exemplary embodiment, for example, the thickness of the black matrix BM is smaller than the thickness of the first light conversion layer RCL, as shown in FIG. 3.

The light transmission layer BTL has a thickness defined by a thickness of the insulating layer INS. The thickness of the light transmission layer BTL is greater than that of the second light conversion layer GCL. In such an embodiment, the light conversion layers LCL may have different thicknesses from each other.

The first light conversion layer RCL converts the light BL provided from the backlight unit 300 to a light RL having a first color. The second light conversion layer GCL converts the light BL provided from the backlight unit 300 to a light GL having a second color. The first color is the red color, and the second color is the green color. The light BL generated by the backlight unit 300 has a third color, and the third color is the blue color.

The light transmission layers BTL correspond to areas of the insulating layer INS corresponding to the pixel areas PA in areas in which the first and second light conversion layers RCL and GCL are not disposed. The light transmission layers BTL transmit the blue light BL provided from the backlight unit 300. Therefore, the lights RL, GL and BL having the red, green and blue colors are output from the display panel 100, so that a predetermined color image is displayed.

The first light conversion layer RCL includes a first resin RIN1 and a plurality of first quantum dots R_QD disposed or distributed in the first resin RIN1. The first quantum dots R_QD are red quantum dots, and the first light conversion layer RCL is a red quantum dot layer.

The second light conversion layer GCL includes the first resin RIN1 and a plurality of second quantum dots G_QD disposed or distributed in the first resin RIN1. The second quantum dots G_QD are green quantum dots, and the second light conversion layer GCL is a green quantum dot layer.

The first quantum dots R_QD include quantum dots each having a size that absorbs the light at the blue wavelength and emits the light at the red wavelength. The second quantum dots G_QD include quantum dots each having a size that absorbs the light at the blue wavelength and emits the light at the green wavelength. The quantum dots are not provided to the light transmission layer BTL. The light conversion does not occur in the light transmission layer BTL such that the light transmission layer BTL transmits a light incident thereto as it is without converting a color thereof.

The first quantum dots R_QD of the first light conversion layer RCL converts the blue light BL provided from the backlight unit 300 to the light RL at the red wavelength. The second quantum dots G_QD of the second light conversion layer GCL converts the blue light BL provided from the backlight unit 300 to the light GL at the green wavelength.

A light conversion efficiency of the quantum dots G_QD that absorb the light BL at the blue wavelength and emit the light GL at the green wavelength may be lower than that of the quantum dots G_QD that absorb the light BL at the blue wavelength and emit the light RL at the red wavelength.

In such an embodiment, the thickness of the second light conversion layer GCL is greater than the thickness of the first light conversion layer RCL, such that the number of the second quantum dots G_QD disposed or distributed in the second light conversion layer GCL may be increased. Accordingly, in such an embodiment, the efficiency of the second light conversion layer GCL that generates the green light may be improved.

Figure 4:
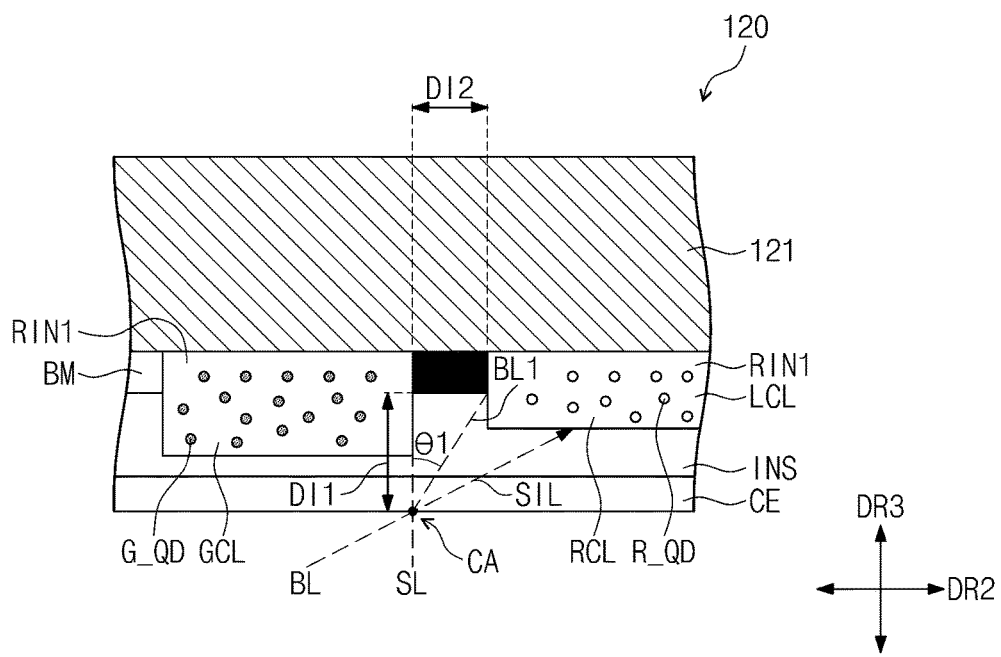
FIG. 4 is an enlarged view showing a second light conversion layer and a black matrix disposed adjacent to the second light conversion layer on a second substrate shown in FIG. 3.

FIG. 4 is an enlarged view showing the second light conversion layer and the black matrix disposed adjacent to the second light conversion layer on the second substrate shown in FIG. 3.

Referring to FIG. 4, an imaginary line extending substantially parallel to the third direction DR3 at a boundary between each light conversion layer LCL and the black matrix BM is referred to as a reference line SL. As shown in FIG. 4, a line extending substantially parallel to the third direction DR3 at the boundary between the second light conversion layer GCL and the black matrix BM is the reference line SL. A contact point of the reference line SL and the lower surface of the second substrate 120 is referred to as a center portion CA.

A line connected between the center portion CA and a lower end of a side surface of the black matrix BM, which is opposite to a side surface of the black matrix BM overlapping the reference line SL in the second direction DR2, is referred to as a first boundary line BL1. As shown in FIG. 4, a line connected between the center portion CA and the lower end of the side surface of the black matrix BM adjacent to the first light conversion layer RCL in the second direction DR2 is referred to as the first boundary line BL1.

An angle between the reference line SL and the first boundary line BL1 with respect to the center portion CA is referred to as a first angle θ1. A distance between the lower surface of the second substrate 120 and the lower surface of the black matrix BM is referred to as a first distance DI1, and a width in the second direction DR2 of the black matrix BM is referred to as a second distance DI2.

In one exemplary embodiment, for example, where the first distance DI1 is about 30 micrometers and the second distance DI2 is about 19 micrometers, the first angle θ1 is about 32.3 degrees.

The light BL exiting from the backlight unit 300 travels at various angles. Among the pixels PX, the green pixels PX corresponding to the second light conversion layers GCL may be operated, while the red and blue pixels PX corresponding to the first light conversion layers RCL and the light transmission layers BTL are not operated.

In a conventional display device, where the light control member 200 is not disposed between the display panel 100 and the backlight unit 300 and the exiting angle of the light BL is greater than the first angle θ1, the light BL traveling to the display panel 100 may be provided to the first light conversion layers RCL and the light transmission layers BTL. In such an a conventional display device, the light BL provided to the first light conversion layers RCL from the backlight unit 300 may include a side surface light SIL exiting at an angle greater than the first angle θ1, as shown in FIG. 4, such that the green light GL may exit from the second light conversion layer GCL, and the red light RL may exit from the first light conversion layer RCL even when the red and blue pixels PX corresponding to the first light conversion layers RCL and the light transmission layers BTL are not operated. Although not shown in FIG. 4, the side surface light exiting at the angle greater than the first angle θ1 may be provided to the light transmission layer BTL, and thus the blue light BL may exit from the light transmission layer BTL. In this case, the red and blue lights RL and BL exit from the display panel 110 in addition to the green light GL, a color mixture may occur.

In an exemplary embodiment, the light control member 200 restricts the exit angle of the light BL provided from the backlight unit 300 to an angle smaller than the first angle θ1 with reference to the third direction DR3. Since the light BL exiting from the light generating members 200 and 300 has the exit angle smaller than the first angle θ1 with respect to the third direction DR3, the light BL may not be provided to the light transmission layer BTL and the first light conversion layer RCL. Thus, the color mixture may be effectively prevented from occurring.

Figure 5:
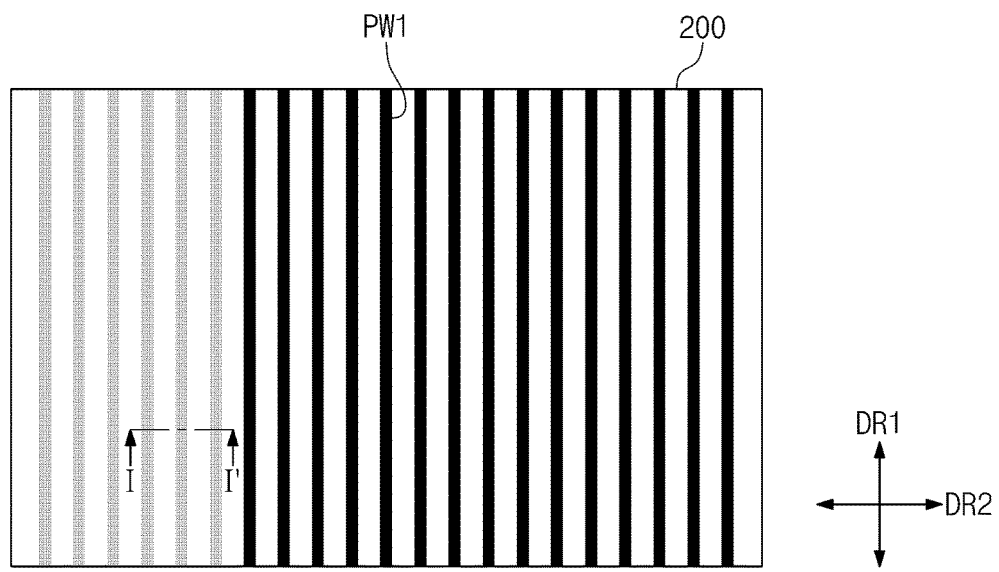
FIG. 5 is a top plan view showing an exemplary embodiment of a light control member shown in FIG. 1.
Figure 6:
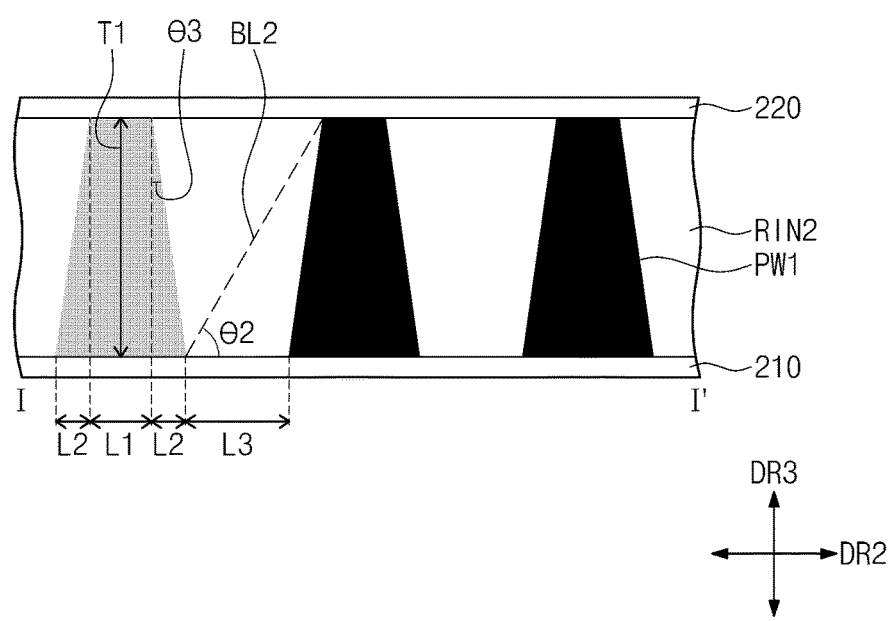
FIG. 6 is a cross-sectional view taken along line I-I' shown in FIG. 5.

FIG. 5 is a top plan view showing an exemplary embodiment of the light control member shown in FIG. 1, and FIG. 6 is a cross-sectional view taken along line I-I' shown in FIG. 5.

Referring to FIGS. 5 and 6, in an exemplary embodiment, the light control member 200 includes a first substrate member 210, a plurality of first barrier wall members PW1 disposed on the first substrate member 210, a second substrate member 220 disposed on the first barrier wall members PW1, and a second resin RIN2 disposed between the first barrier wall members PW1. The first and second substrate members 210 and 220 include polyethylene terephthalate ("PET").

The first barrier wall members PW1 extend in the first direction DR1 and are arranged in the second direction DR2. The first barrier wall members PW1 are spaced apart from each other at regular intervals in the second direction DR2. The first barrier wall members PW1 include a light absorbing material. In one exemplary embodiment, for example, the first barrier wall members PW1 may include a carbon black.

Although not shown in FIGS. 5 and 6, the first barrier wall members PW1 may be disposed independently of the positions of the pixel areas BPA, GPA, and RPA and the non-pixel area NPA. In one exemplary embodiment, for example, the first barrier wall members PW1 are disposed to expose only the non-pixel area NPA. In one alternative exemplary embodiment, for example, the first barrier wall members PW1 are disposed to expose only the pixel areas BPA, GPA, and RPA.

In an exemplary embodiment, the first barrier wall members PW1 may partially overlap the pixel areas BPA, GAP, and RPA or the non-pixel area NPA according to a distance between the first barrier wall members PW1. In an exemplary embodiment, only some of the first barrier wall members PW1 are disposed to overlap the pixel areas BPA, GPA, and RPA.

In an exemplary embodiment, as shown in FIG. 6, each of the first barrier wall members PW1 has a trapezoid cross-sectional shape in which a width of a lower surface thereof is greater than a width of an upper surface thereof and left and right side surfaces thereof are inclined.

The second resin RIN2 may include an acrylic resin. The second resin RIN2 fills a space defined between two adjacent first barrier wall members PW1 and between the first substrate member 210 and the second substrate member 220.

Hereinafter, as shown in FIG. 6, a thickness in the third direction DR3 of the first barrier wall members PW1 is referred to as a first thickness T1. A width in the second direction DR2 of the upper surface of the first barrier wall members PW1 is referred to as a first length L1, and a width of a side portion of the lower surface of the first barrier wall members PW1 that does not overlap the upper surface of the first barrier wall members PW1 is referred to as a second length L2. A distance between lower surfaces of the first barrier wall members PW1 adjacent to each other in the second direction DR2 is referred to as a third length L3.

As shown in FIG. 6, a line connected between a lower side of a first side surface of each first barrier wall member PW1 and an upper end of a second side surface of the first barrier wall member PW1 facing the first side surface is referred to as a second boundary line BL2. An angle between the second boundary line BL2 and a horizontal surface is referred to as a second angle θ2. The horizontal surface is a plane surface substantially parallel to the first and second directions DR1 and DR2. An angle between the third direction DR3 and the side surface of the first barrier wall members PW1 is referred to as a third angle θ3.

In an exemplary embodiment, the second angle θ2 may be greater than an angle obtained by subtracting the first angle θ1 from 90 degrees. The first barrier wall members PW1 restrict the exit angle of the light BL to an angle smaller than an angle obtained by subtracting the second angle θ2 from 90 degrees.

In an exemplary embodiment, the first barrier wall members PW1 absorb the light, and the exit angle of the light BL exiting from the backlight unit 300 may have an angle greater than the second angle θ2 with respect to the horizontal surface. Accordingly, the exit angle of the light BL exiting from the backlight unit 300 has an angle smaller than the first angle θ1 with respect to the third direction DR3.

In one exemplary embodiment, for example, where the first angle θ1 is about 32.3 degrees and the second angle θ2 is about 60 degrees, the exit angle of the light BL exiting from the backlight unit 300 has the angle smaller than about 30 degrees with respect to the third direction DR3.

The first barrier wall members PW1 may have a size determined in a way such that the exit angle of the light BL exiting from the backlight unit 300 has the angle greater than the second angle θ2 with respect to the horizontal surface. In one exemplary embodiment, for example, the first thickness T1 may be within a range from about 20 micrometers to about 150 micrometers. In such an embodiment, the first length L1 may be equal to or greater than about 3 micrometers.

In an exemplary embodiment, the third angle θ3 may be in a range from about 1 degree to about 3 degrees. In such an embodiment, the second length L2 is determined by multiplying the first thickness T1 by tangent(θ3). In such an embodiment, the third length L3 is in a range from about 20 micrometers to about 100 micrometers. The second angle θ2 is in a range from about 60 degrees to about 80 degrees.

In an exemplary embodiment, the exit angle of the light BL exiting from the backlight unit 300 is restricted to the angle smaller than the first angle θ1 by the first barrier wall members PW1 of the light control member 200. In such an embodiment, as described above, since the exit angle of the light BL exiting from the backlight unit 300 is restricted to the angle smaller than the first angle θ1, the color mixture may be effectively prevented from occurring.

In an exemplary embodiment, the display apparatus 400 restricts the exit angle of the light BL exiting from the backlight unit 300 to the predetermined angle, such that that the color mixture is effectively prevented from occurring.

Figure 7:
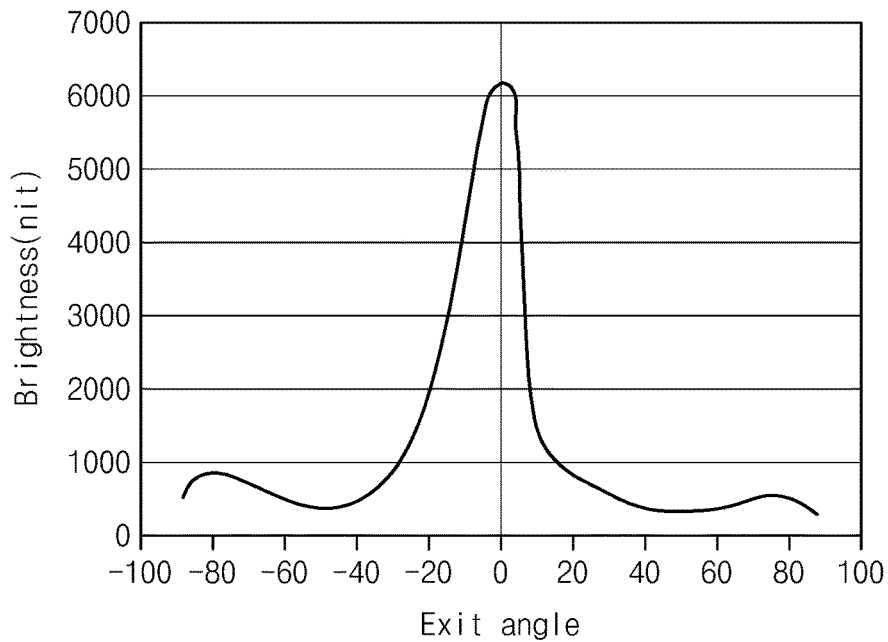
FIG. 7 is a graph showing a light emission distribution of a backlight unit of a conventional display apparatus that does not include a light control member.
Figure 8:
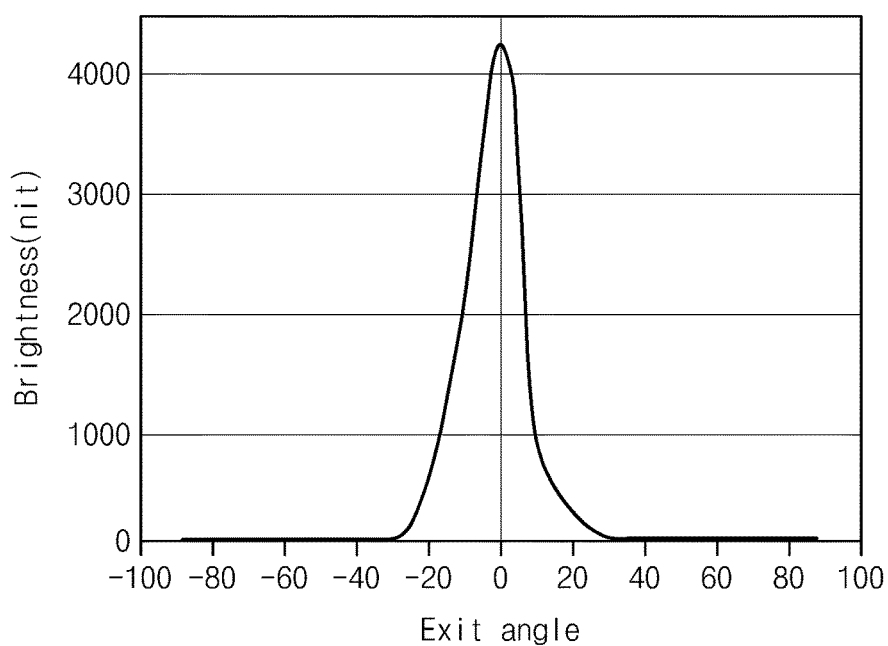
FIG. 8 is a graph showing a light emission distribution of a backlight unit of a display apparatus according to an exemplary embodiment of the disclosure.

FIG. 7 is a graph showing a light emission distribution of a backlight unit of a conventional display apparatus that does not include a light control member, and FIG. 8 is a graph showing a light emission distribution of a backlight unit of a display apparatus according to an exemplary embodiment of the disclosure.

In FIGS. 7 and 8, a horizontal axis represents the exit angle of the light exiting from the backlight unit, and a vertical axis represents a brightness of the light exiting from the backlight unit. For the convenience of description, a value inclined toward a right side with respect to the third direction DR3 is represented by a positive (+) angle, and a value inclined toward a left side with respect to the third direction DR3 is represented by a negative (−) angle. Hereinafter, for the convenience of description, the exit angle will be represented by an absolute value without using the positive (+) and negative (−) parts.

Referring to FIG. 7, among the lights generated by the backlight unit of the conventional display apparatus, the exit angle of the light traveling in the third direction DR3 is zero (0) and has highest brightness. The exit angle of the light generated by the backlight unit is in a range from about 0 degrees to about 90 degrees. Accordingly, the color mixture may occur in the conventional display apparatus.

Referring to FIG. 8, in an exemplary embodiment, the exit angle of the light BL exiting from the backlight unit 300 is restricted to the angle smaller than the first angle θ1 by the first barrier wall members PW1 of the light control member 200. In an exemplary embodiment, the exit angle of the light BL exiting from the backlight unit 300 may be restricted to the angle smaller than about 30 degrees by the first barrier wall members PW1 of the light control member 200. Among the light BL exiting from the backlight unit 300, lights exiting at the angle equal to or greater than about 30 degrees are absorbed and blocked by the first barrier wall members PW1.

Figure 9:
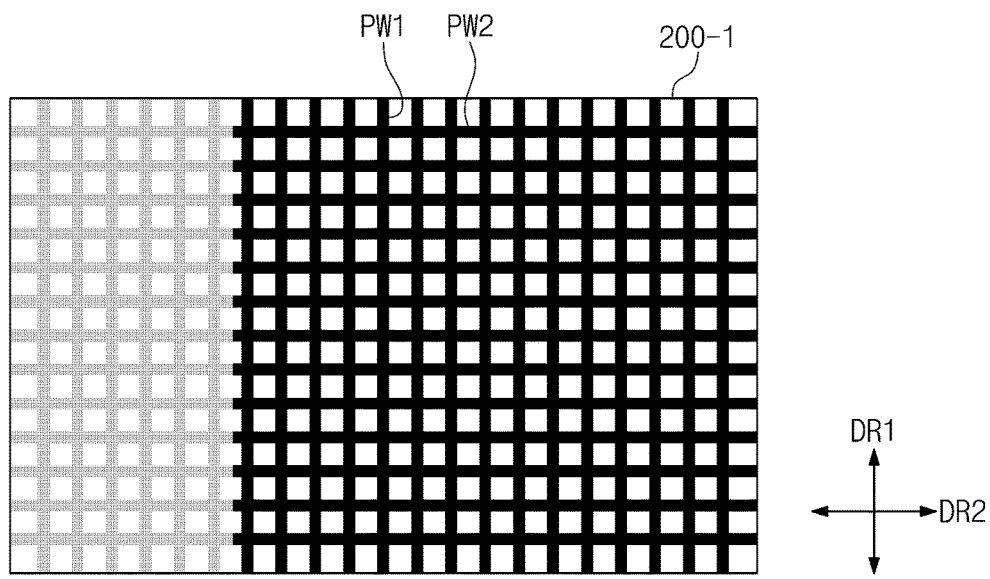
FIG. 9 is a top plan view showing a light control member of a display apparatus according to another exemplary embodiment of the disclosure.

FIG. 9 is a top plan view showing an alternative exemplary embodiment of a light control member of a display apparatus.

The display apparatus including the light control member shown in FIG. 9 has the same structure and function as those of the display apparatus 400 shown in FIG. 1 except for a light control member 200-1.

Referring to FIG. 9, an exemplary embodiment of the light control member 200-1 includes a plurality of first barrier wall members PW1 and a plurality of second barrier wall members PW2 crossing the first barrier wall members PW1. The first barrier wall members PW1 extend in the first direction DR1 and are arranged in the second direction DR2. The first barrier wall members PW1 shown in FIG. 9 have the same structure and function as those of the first barrier wall members PW1 shown in FIG. 5. Accordingly, the first barrier wall members PW1 shown in FIG. 9 are assigned with the same reference numerals as the first barrier wall members PW1 shown in FIG. 5.

The second barrier wall members PW2 extend in the second direction DR2 and are arranged in the first direction DR1. The second barrier wall members PW2 are arranged in the first direction DR1 at regular intervals. The second barrier wall members PW2 have the same structure and function as those of the first barrier wall members PW1 except for the direction in which the second barrier wall members PW2 extend. Therefore, any repetitive detailed description of the second barrier members PW2 will be omitted.

The exit angle of the light exiting from the backlight unit is restricted to an angle smaller that the first angle θ1 with respect to the third direction DR3 by the first and second barrier wall members PW1 and PW2 of the light control member 200-1. Since the exit angle of the light BL exiting from the backlight unit is restricted to the angle smaller that the first angle θ1 with respect to the third direction DR3, the display apparatus including such an embodiment of the light control member 200-1 may effectively prevent the color mixture from occurring.

FIGS. 10A to 10D are views showing shapes of alternative exemplary embodiments of a first barrier wall member.

For the convenience of illustration, FIGS. 10A to 10D show a portion of the first substrate member 210 and one first barrier wall member PW1 disposed on the portion of the first substrate member 210. Although not shown in FIGS. 10A to 10D, the second barrier wall members PW2 may have the same structure and function as those of the first barrier wall member PW1 shown in FIGS. 10A to 10D.

Referring to FIGS. 10A to 10D, the first barrier wall member PW1 may have various shapes such that the exit angle of the light BL exiting from the backlight unit 300 is greater than the second angle θ2 with respect to the horizontal surface.

Figure 10A:
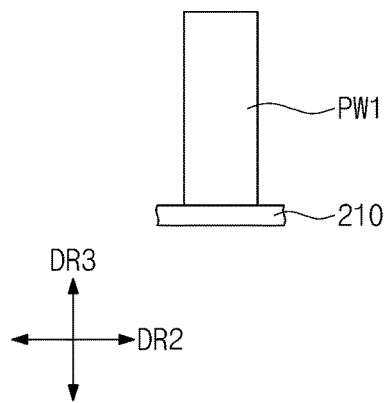
FIGS. 10A to 10D are views showing shapes of alternative exemplary embodiments of a first barrier wall member.

In an exemplary embodiment, as shown in FIG. 10A, the first barrier wall member PW1 has a substantially rectangular shape. The first barrier wall member PW1 having the rectangular shape has long sides in the third direction DR3 and short sides in the second direction DR2.

Figure 10B:
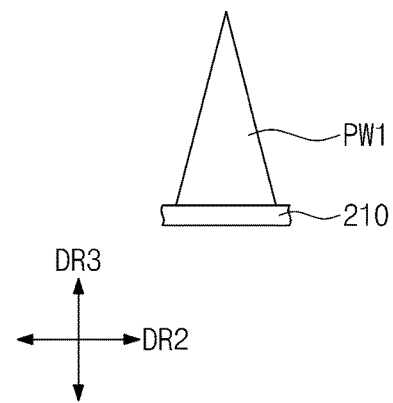

In an alternative exemplary embodiment, as shown in FIG. 10B, the first barrier wall member PW1 has a substantially triangular shape extending in the third direction DR3. The first barrier wall member PW1 has an isosceles triangular shape having two sides that have the same length, and a first side of the first barrier wall member PW1 except for the two sides is placed on the first substrate member 210.

Figure 10C:
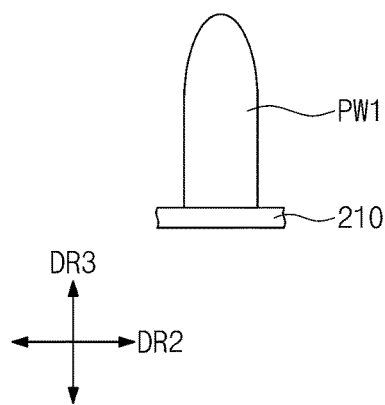

In another alternative exemplary embodiment, as shown in FIG. 10C, the first barrier wall member PW1 extends in an upper direction DR3, and a predetermined area of an upper portion of the first barrier wall member PW1 has a round shape.

Figure 10D:
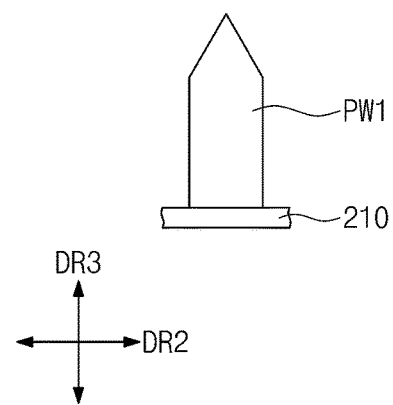

In another alternative exemplary embodiment, as shown in FIG. 10D, the first barrier wall member PW1 extends in the upper direction DR3, and a predetermined area of the upper portion of the first barrier wall member PW1 has a triangular shape.

Although the exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A display apparatus comprising:
a display panel comprising:
   a first substrate comprising a plurality of pixels;
   a second substrate comprising:
      a plurality of light conversion layers; and
      a black matrix disposed between the light conversion layers;
a light generating member which provides a light to the display panel; and
a light control member disposed between the display panel and the light generating member, wherein the light control member comprises:
   a first substrate member;
   a second substrate member facing the first substrate member; and
   a plurality of first barrier wall members disposed between the first and second substrate members, extending in a first direction, and arranged in a second direction crossing the first direction,
   wherein the first barrier wall members restrict an exit angle of the light from the light generating member to a predetermined angle, and
   the predetermined angle is smaller than an angle defined by a distance between a lower surface of the second substrate and a lower surface of the black matrix, and a width of the black matrix in the second direction.

2. The display apparatus of claim 1, wherein the first barrier wall members are arranged in the second direction at regular intervals.

3. The display apparatus of claim 1, wherein the first barrier wall members comprise a carbon black which absorbs the light.

4. The display apparatus of claim 1, wherein the light conversion layers comprise:
   a plurality of first light conversion layers which converts the light to a light having a first color;
   a plurality of second light conversion layers which converts the light to a light having a second color; and
   a plurality of light transmission layers which transmits the light, wherein the light has a third color.

5. The display apparatus of claim 4, wherein each of the first light conversion layers comprises:
   a plurality of first quantum dots which converts the light to the light having the first color; and
   a first resin which accommodates the first quantum dots.

6. The display apparatus of claim 4, wherein each of the second light conversion layers comprises:
   a plurality of second quantum dots which converts the light to the light having the second color; and
   a first resin which accommodates the second quantum dots.

7. The display apparatus of claim 4, wherein
the first color is a red color,
the second color is a green color, and
the third color is a blue color.

8. The display apparatus of claim 4, wherein
the light transmission layers have a thickness greater than a thickness of the second light conversion layers,
the thickness of the second light conversion layers is greater than a thickness of the first light conversion layers, and
the black matrix has a thickness equal to or smaller than the thickness of the first light conversion layers.

9. The display apparatus of claim 4, wherein the display panel comprises:
a plurality of pixel areas corresponding to the pixels; and
a non-pixel area disposed between the pixel areas,
wherein the light conversion layers are disposed in the pixel areas, and
the black matrix is disposed in the non-pixel area.

10. The display apparatus of claim 4, wherein
the first barrier wall members restrict the exit angle of the light to an angle smaller than a first angle between a reference line and a first boundary line,
wherein the reference line is defined by a line extending in a third direction crossing the first and second directions at a boundary between each light conversion layer and the black matrix, and
the first boundary line is defined by a line connecting a lower end of a side surface of the black matrix, which is opposite to another surface of the black matrix overlapping the reference line, to a contact point at which the reference line makes contact with a lower surface of the second substrate.

11. The display apparatus of claim 10, wherein
a second angle between a horizontal surface and a second boundary line is greater than an angle obtained by subtracting the first angle from about 90 degrees,
wherein the second boundary line is defined by a line connecting a lower end of a first side surface of a first barrier wall member to an upper end of a second side surface of an adjacent first barrier wall member, which faces the first side surface of the first barrier wall.

12. The display apparatus of claim 11, wherein the second angle is in a range from about 60 degrees to about 80 degrees.

13. The display apparatus of claim 1, wherein
the first barrier wall members have a thickness in a range from about 20 micrometers to about 150 micrometers,
a width of an upper surface of the first barrier wall members is equal to or greater than about 3 micrometers, and
a distance between lower surfaces of the first barrier wall members adjacent to each other is in a range from about 20 micrometers to about 100 micrometers.

14. The display apparatus of claim 13, wherein
a width of a portion of a lower surface of the first barrier wall members, which does not overlap an upper surface of the first barrier wall members, is obtained by the following equation: W=T1×tan(θ3),
W denotes the width of the portion of the lower surface of the first barrier wall members,
T1 denotes the thickness of the first barrier wall members,
θ3 denotes a third angle between a third direction crossing the first and second directions and a side surface of the first barrier wall members, and
the third angle is in a range from about 1 degree to about 3 degrees.

15. The display apparatus of claim 1, wherein the light control member further comprises a second resin disposed between the first barrier wall members.

16. The display apparatus of claim 15, wherein
the first and second substrate members comprise polyethylene terephthalate, and
the second resin comprises an acrylic resin.

17. The display apparatus of claim 1, wherein
each of the first barrier wall members has a trapezoid shape, a rectangular shape or a triangular shape, and
a predetermined area of an upper portion of each of the first barrier wall members has a round shape or a triangular shape.

18. The display apparatus of claim 1, wherein the light control member further comprises a plurality of second barrier wall members extending in the second direction and arranged in the first direction at regular intervals.

19. A light generating member being a part of a display apparatus, the display apparatus comprising:
a display panel comprising:
a first substrate comprising a plurality of pixels;
a second substrate comprising a black matrix;
the light generating member comprising:
a backlight unit which generates a light; and
a light control member disposed on the backlight unit, wherein the light control member comprises:
a first substrate member;
a second substrate member facing the first substrate member; and
a plurality of first barrier wall members disposed between the first and second substrate members, extending in a first direction, and arranged in a second direction crossing the first direction,
wherein the first barrier wall members restrict an exit angle of the light exiting from the backlight unit to a predetermined angle, and
the predetermined angle is smaller than an angle defined by a distance between a lower surface of the second substrate and a lower surface of the black matrix, and a width of the black matrix in the second direction.

20. The light generating member of claim 19, wherein the first barrier wall members are arranged in the second direction at regular intervals and comprise a carbon black which absorbs the light.

21. The light generating member of claim 19, wherein the first barrier wall members restrict the exit angle of the light to an angle smaller than an angle obtained by subtracting a second angle from about 90 degrees,
wherein the second angle is an angle between a horizontal surface and a second boundary line connecting a lower end of a first side surface of a first barrier wall member to an upper end of a second side surface of an adjacent first barrier wall member, which faces the first side surface.

22. The light generating member of claim 21, wherein the second angle is in a range from about 60 degrees to about 80 degrees.

23. The light generating member of claim 19, wherein
the light control member further comprises a second resin disposed between the first barrier wall members,
the first and second substrate members comprise polyethylene terephthalate, and
the second resin comprises an acrylic resin.

24. A display apparatus comprising:
a display panel comprising:
a first substrate comprising a plurality of pixels;
a second substrate comprising:
a plurality of light conversion layers having different thicknesses from each other; and
a black matrix disposed between the light conversion layers; and
a liquid crystal layer disposed between the first substrate and the second substrate;
a light generating member which provides a light to the display panel; and
a light control member disposed between the display panel and the light generating member, wherein the light control member comprises:
a first substrate member;
a second substrate member facing the first substrate member;
a plurality of first barrier wall members disposed between the first and second substrate members, extending in a first direction, and arranged in a second direction crossing the first direction at regular intervals; and
a plurality of second barrier wall members extending in the second direction to cross the first barrier wall members and arranged in the first direction at regular intervals,
wherein the first barrier wall members restrict an exit angle of the light exiting from the light generating unit to a predetermined angle, and
the predetermined angle is smaller than an angle defined by a distance between a lower surface of the second substrate and a lower surface of the black matrix, and a width of the black matrix in the first direction or the second direction.

25. The display apparatus of claim 24, wherein the light conversion layers comprise:
a plurality of first light conversion layers which converts the light to a light having a red color;
a plurality of second light conversion layers which converts the light to a light having a green color; and
a plurality of light transmission layers which transmits the light, wherein the light has a blue color.

26. The display apparatus of claim 25, wherein
each of the first light conversion layers comprises a plurality of first quantum dots which converts the light to the light having the red color, and
each of the second light conversion layers comprises a plurality of second quantum dots which converts the light to the light having the green color.

27. The display apparatus of claim 25, wherein
the light transmission layers have a thickness greater than a thickness of the second light conversion layers,
the thickness of the second light conversion layers is greater than a thickness of the first light conversion layers, and
the black matrix has a thickness equal to or smaller than the thickness of the first light conversion layers.

28. The display apparatus of claim 25, wherein the display panel comprises:
a plurality of pixel areas corresponding to the pixels; and
a non-pixel area disposed between the pixel areas,
wherein the light conversion layers are disposed in the pixel areas, and
the black matrix is disposed in the non-pixel area.

29. The display apparatus of claim 25, wherein the first barrier wall members restrict the exit angle of the light to an angle smaller than a first angle between a reference line and a first boundary line,
wherein the reference line is defined by a line extending in a third direction crossing the first and second directions at a boundary between each light conversion layer and the black matrix, and
the first boundary line is defined by a line connecting a lower end of a side surface of the black matrix opposite to a side surface of the black matrix which overlaps the reference line to a contact point at which the reference line makes contact with a lower surface of the second substrate.

30. The display apparatus of claim 29, wherein
a second angle between a horizontal surface and a second boundary line is greater than an angle obtained by subtracting the first angle from about 90 degrees, and the second boundary line is defined as a line connecting a lower end of a first side surface of a first barrier wall member to an upper end of a second side surface of an adjacent first barrier wall member, which faces the first side surface.

31. The display apparatus of claim 24, wherein the light control member further comprises a second resin disposed between the first barrier wall members.

32. The display apparatus of claim 31, wherein
the first barrier wall members comprise a carbon black which absorbs the light,
the first and second substrate members comprise polyethylene terephthalate, and
the second resin comprises an acrylic resin.

* * * * *